Nov. 13, 1928.
H. L. SNYDER
1,691,502
VEHICLE DIRECTION SIGNAL
Filed April 14, 1926
*Fig. 1.*
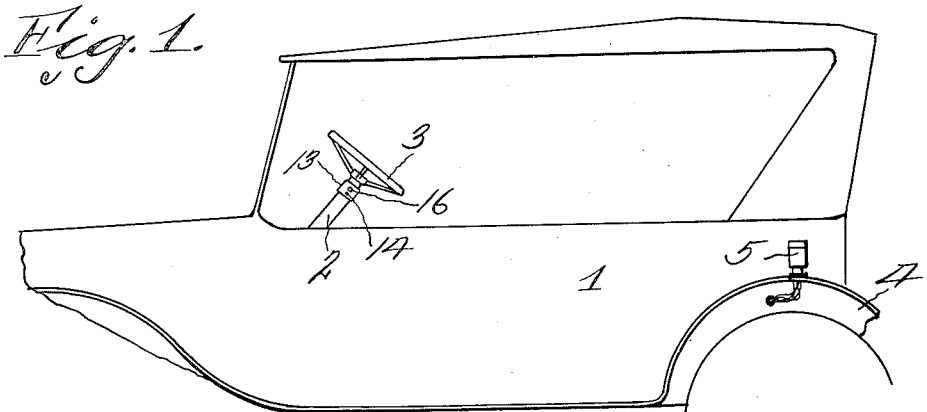
*Fig. 2.*
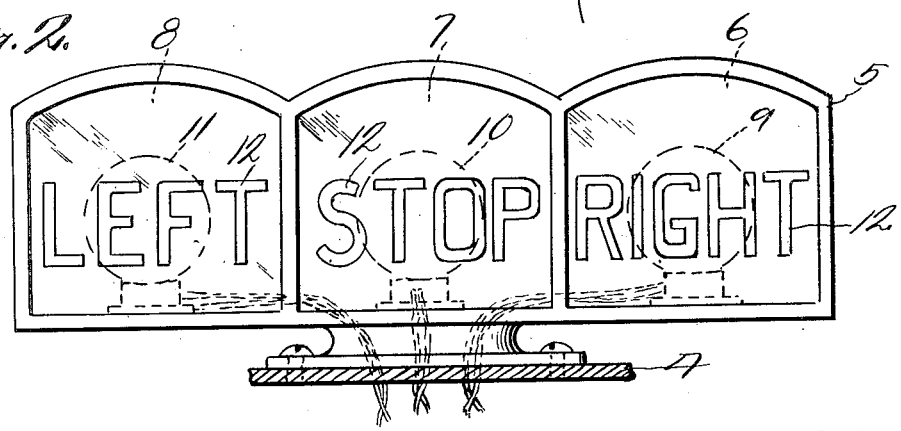
*Fig. 4.*
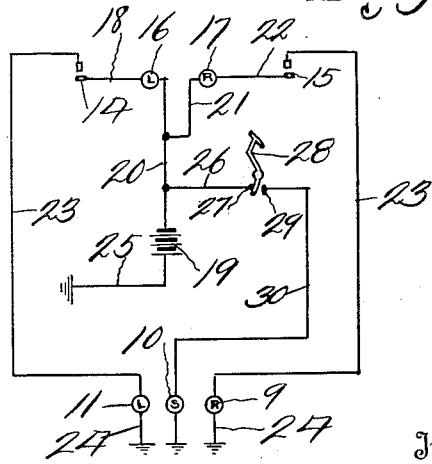
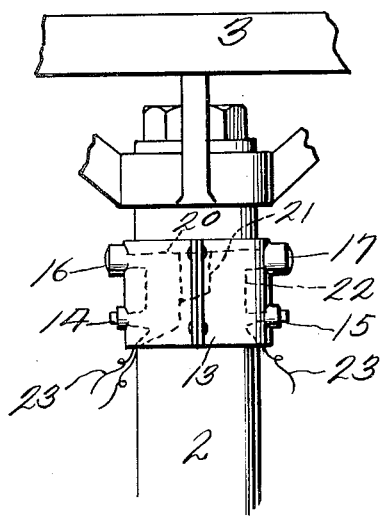
*Fig. 3.*
Inventor
H. L. Snyder
By Philip A. H. Sewell
Attorney Patented Nov. 13, 1928.

1,691,502

UNITED STATES PATENT OFFICE.

HIRAM L. SNYDER, OF ST. LOUIS, MISSOURI.

VEHICLE DIRECTION SIGNAL.

Application filed April 14, 1926. Serial No. 101,950.

The invention relates to vehicle direction signals, and has for its object to provide a device of this character comprising a light box carried by the rear end of the vehicle and provided with left, right and stop indicia, and lamps in said boxes in circuit with a single battery and means whereby said lamps may be illuminated as desired, the stop lamp is controlled by the brake pedal and the right and left turn indicating lamps controlled by switches located on the steering column adjacent the steering wheel.

A further object is to provide lamps relatively small adjacent the steering wheel and in circuit with the right and left turn lamps whereby they will be illuminated upon the closing of the switches, thereby allowing the operator to easily ascertain if the left and right hand turn lamps in the light box are operated, consequently avoiding accidents which are common incident to the non-operation of the lamps.

A further object is to mount the push button switches and the small indicating lamps in a single sleeve surrounding the steering column whereby the same can be applied to a conventional form of steering column without varying the construction thereof.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a side elevation of a portion of a conventional form of automobile, showing the device applied thereto.

Figure 2 is a rear elevation of the light box.

Figure 3 is a rear elevation of a portion of the steering column and steering wheel.

Figure 4 is a diagrammatic view of the circuit.

Referring to the drawings, the numeral 1 designates a conventional form of automobile, 2 the steering column thereof and 3 the steering wheel. Disposed on the rear mud guard 4 is a light box 5, which light box is provided with a plurality of compartments 6, 7 and 8, in which are disposed electric lamps 9, 10 and 11. Although the light box 5 is described as disposed on the mud guard 4, it is obvious it may be disposed in any position desired or split into as many sections as desired and located in different positions. Light box 5 is provided with indicia 12 indicating a right, left or stop operation and in operation the lamps 9, 10 and 11 are lighted through means hereinafter set forth for signalling operators of approaching vehicles from the rear as to a contemplated right or left turn or stopping of the vehicle.

Surrounding the steering column 2 is a split sleeve 13, which sleeve is provided with oppositely disposed push button circuit makers and breakers 14 and 15, which are adapted to be operated by the operator for closing circuits to the right and left signalling compartments 6 and 8 of the light box. The sleeve 13, preferably above the circuit makers 14 and 15 are provided with electric lamps 16 and 17, which are adapted to be lighted simultaneously with the lamps 9 and 11 for indicating to the operator of the automobile that the rear signalling lamps are operating or out of order. Lamp 16 is connected to the switch 14 by the wire 18, and to the battery 19 by the wire 20, and the lamp 17 is connected to the wire 20 by the conductor wire 21 and the switch 15 by the conductor wire 22. Wires 23 connect switches 14 and 15 with the left signalling lamp 11 and the right signalling lamp 9, which lamps are grounded by means of wires 24, and the battery 19 is grounded by means of conductor wire 25, therefore it will be seen when either of the switches 14 and 15 are closed, the corresponding light 11 or 9 will be lighted for indicating the contemplated turn. At the same time either of the lights 16 or 17 carried by the sleeve 13 will be illuminated and the operator will know that his rear signalling lights are operated. Lamps 16 and 17 are placed above the switches 14 and 15, therefore it will be seen during the manipulation of either switch 14 or 15 the hand of the operator will not conceal the lamps 16 and 17 from view.

Connected to the wire 20 is a conductor wire 26 which wire is connected at 27 to the brake pedal 28, and which brake pedal cooperates with a contact 29 when moved to opposite positions, therefore it will be seen the brake pedal 28 will close a circuit through the wire 30, lamp 10 which is grounded, ground wire 25, battery 19 and conductor wire 26, thereby lighting the stop lamp 10 when the brake is applied to the automobile and forms a signal to an approaching vehicle from the rear that the operator is applying his brakes to stop or slow down in speed, consequently the approaching vehicle operator can govern himself accordingly to avoid a rear end collision with a signalling vehicle.

From the above it will be seen that a vehicle direction signal is provided which is simple in construction, and with which danger of collision incident to right and left turn is obviated, and at the same time one wherein auxiliary signalling lights are provided adjacent the switches on the steering column by means of which the operator will immediately know if the rear signalling lights are operating. It will also be seen that the single sleeve around the steering column carries the auxiliary signalling lights and the switches where they are within easy reach and view of the operator, and it will not be necessary to vary the construction of the steering column in applying the device thereto.

The invention having been set forth what is claimed as new and useful is:—

1. The combination with a steering column, a sleeve carried by said column adjacent its upper end, indicating lamps carried by opposite sides of said sleeve, circuit makers and breakers carried by opposite sides of said sleeve below the respective indicating lamps, said circuit makers and breakers controlling circuits to the lamp.

2. The combination with an automobile steering column, of a sleeve surrounding said column, said sleeve being split, indicating lamps carried by opposite sides of the sleeve and positioned for projecting rays in opposite directions and circuit makers and breakers carried by the sleeve for controlling the lamps and disposed below the lamps.

In testimony whereof I hereunto affix my signature.

HIRAM L. SNYDER.